United States Patent
Zhu

(10) Patent No.: US 6,446,016 B1
(45) Date of Patent: Sep. 3, 2002

(54) SIZING AND INSERTION OF DECOUPLING CAPACITANCE

(75) Inventor: Qing Zhu, Castro Valley, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/457,836

(22) Filed: Dec. 8, 1999

(51) Int. Cl.$^7$ ................................................ G01R 29/26
(52) U.S. Cl. ........................ 702/69; 702/191; 702/193; 324/613
(58) Field of Search .............................. 702/65, 69, 119, 702/191, 193; 703/13, 21, 22; 324/613, 713, 719–720; 333/181, 182

(56) References Cited

U.S. PATENT DOCUMENTS

| 5,068,631 A | * 11/1991 | Vince | 174/250 |
| 5,790,839 A | * 8/1998 | Luk et al. | 713/300 |
| 6,044,296 A | * 3/2000 | Zhu et al. | 607/13 |

OTHER PUBLICATIONS

Chen et al; on–chip decoupling capacitor optimization for high–performance VLSI design; IEEE Catalog #95TH8104, 1995.*

P.E. Gronowski, W.J. Bowhill, R.P. Preston, M.K. Gowan, & R.L. Allmon, "High–performance microprocessor design", IEEE Journal of Solid–State Circuits, vol. 33, No. 5, May 1998, pp. 676–686.

H.H. Chen, "Power supply noise analysis methodology for deep–submicron VLSI chip design", Proc. of Design Automation Conference, 1997, pp. 638–643.

M.T. Bohr, "Interconnect scaling—the real limiter to high performance ULSI", Solid State Technology Journal, Sep. 1996, pp. 105–111, (Missing pp. 107–108).

H.H. Chen, "Minimizing chip–level simultaneous switching noise for high–performance microprocessor design", Author Affiliation: Thomas J. Watson Research Center Source: Proceedings—IEEE International Symposium on Circuits & Systems 4 May 12–15, 1996, Sponsored by: IEEE p. 544–547.

* cited by examiner

*Primary Examiner*—Bryan Bui
(74) *Attorney, Agent, or Firm*—Blakely Sokoloff Taylor & Zafman LLP

(57) ABSTRACT

A method and apparatus for allocating decoupling capacitance in a power grid is provided. A power grid model of an RLC network is evaluated to identify the power nodes that have peak voltages exceeding a minimum voltage threshold and a maximum voltage threshold. For each noisy node that violates the thresholds, a decoupling capacitor is inserted. The power grid is once again re-evaluated to determine of any of the power nodes still violate the voltage thresholds. For those violating power nodes, the size of the decoupling capacitor is incremented. This process of incrementing the size of the decoupling capacitance and re-evaluating the power grid is repeated until all the power nodes are within a noise budget or the noise level for each power node is within the thresholds. The decoupling capacitance is then re-evaluated as it is iteratively decremented while maintaining the power noise within the thresholds. This method of inserting and sizing decoupling capacitance allows the power noise thresholds, to be satisfied while optimizing the size of the decoupling capacitance.

20 Claims, 7 Drawing Sheets

| 5% | 5% | 5% | 5% |
|----|----|----|----|
| 5% | 5% | 5% | 5% |
| 5% | 5% | 5% | 5% |
| 5% | 5% | 5% | 5% |

FIG. 2
(PRIOR ART)

SIZING AND INSERTION OF DECOUPLING CAPACITANCE

FIELD OF THE INVENTION

The present invention relates generally to field of integrated circuit (IC) design. More specifically, the present invention is directed to a method and apparatus for sizing and insertion of decoupling capacitance.

BACKGROUND

High-speed digital integrated circuits (ICs) require a stable reference voltage, regardless of the input current required. However, spike currents generated during switching can cause Vcc and ground (GND) voltage level to fluctuate, causing ringing in the output waveform or a delay in response speed. The switching noise is caused by changes in current through various parasitic inductances. The simultaneous switching of I/O drivers and internal circuits can increase the voltage drop on the power supply. This power supply noise not only will introduce additional signal delay, but also may cause false switching of logic gates. Decoupling capacitors are used to reduce the impedance between power and ground, minimizing the effects of current spikes and board noise on the IC, keeping power supply within specification, and providing signal integrity.

For low-frequency power drop problems, it may be adequate to use only the off-chip decoupling capacitors. However, for high-frequency power drop problems, the on-chip decoupling capacitor is more effective due to its proximity to the switching activities. A problem with having on-chip decoupling capacitance to control the power noise is the size of the decoupling capacitors. The size of the decoupling capacitors can consume a significant part of die size, ranging generally from 3% to 15% of the die size.

One existing method of sizing decoupling capacitance uses a maximum-frequency analysis. Another method of sizing decoupling capacitance uses a worst-case preallocation technique where allocation is based on a percentage of layout area in a specific layout window. The percentage of the layout area and the layout window are given as design guidelines. The design guidelines are determined based on the study of the power noise budget and power supply network topologies on chip and on package. For example, the design guideline specifies that within 200 $\mu$m layout window, 10–20% area should be used for the decoupling capacitance. Generally, these methods will result in a conservative estimate of the area reserved for decoupling capacitance.

SUMMARY OF THE INVENTION

According to one aspect of the invention, a method for allocating decoupling capacitance in a power grid is provided. The power grid is evaluated to identify noisy nodes. For each noisy node that violates voltage thresholds, a decoupling capacitor is inserted. The power grid is re-evaluated to determine the power nodes that still violate the voltage thresholds. The size of the decoupling capacitor at each noisy node is incremented until the corresponding power node is brought to within the voltage thresholds.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 2 illustrates an exemplary diagram of a prior art technique of device size preallocation for decoupling capacitance.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

Some portions of the detailed descriptions which follow are presented in terms of algorithms and symbolic representations of operations on data bits within a computer memory. These algorithmic descriptions and representations are used by those skilled in the data processing arts to most effectively convey the substance of their work to others skilled in the art. An algorithm is here, and generally, conceived to be a self-consistent sequence of processes leading to a desired result. The processes are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type; of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Figure 1:
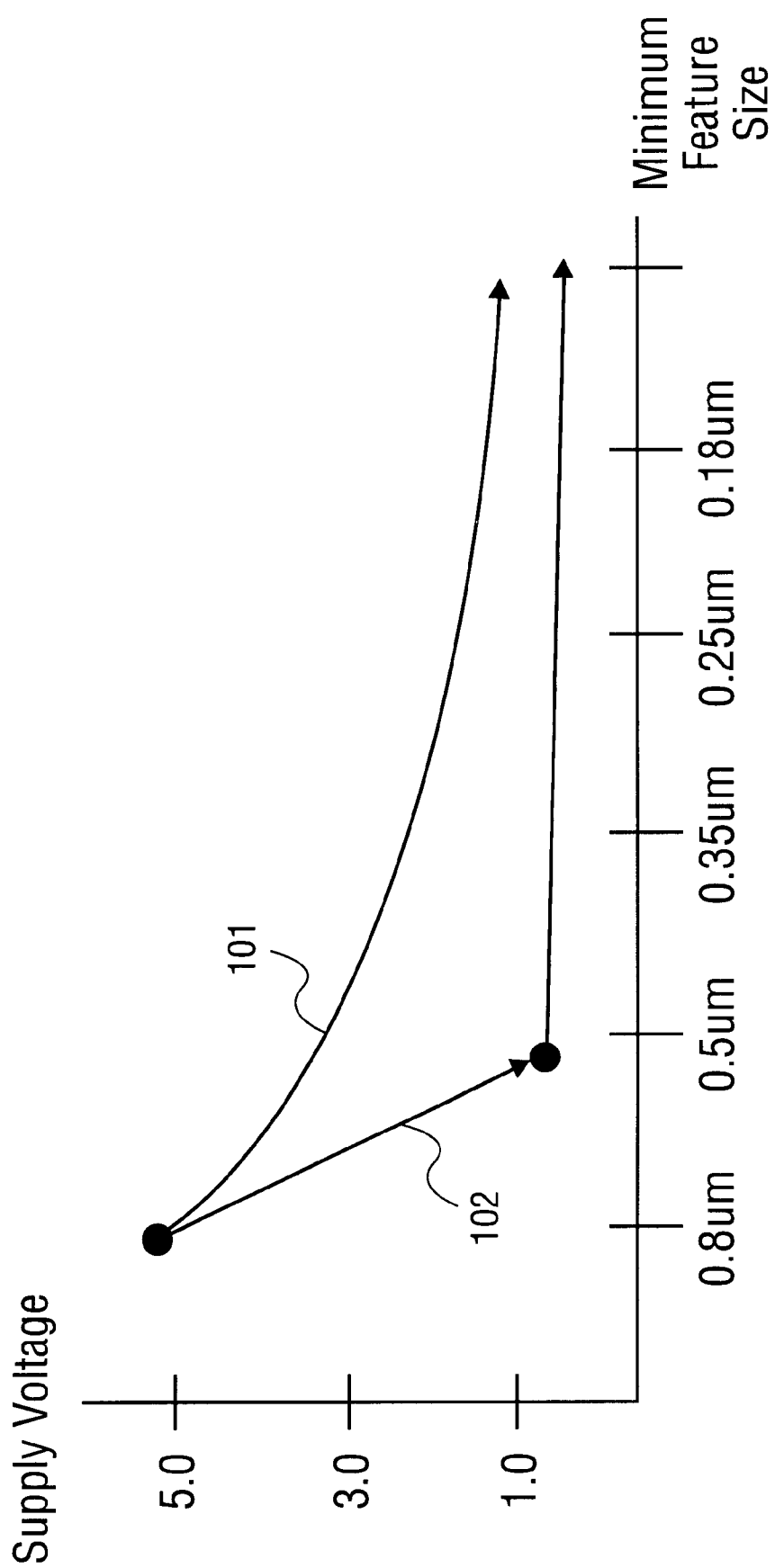
FIG. 1 shows a graphical representation of the relationship between the voltage level and the chip size in high-speed designs and in low power designs.

FIG. 1 illustrates in graphical representation the correlation between supply voltage and chip size in high-speed chip design and in low-power chip design. The y-axis represents the supply voltage or Vdd. The x-axis represents the minimum feature size. Graph 101 represents the correlation between the supply voltage and minimum feature size of the chip processing technology in high-speed designs such as high performance microprocessor. As the amount of transistors per chip increases or as the size of the chips decreases, the supply voltage level is reduced correspondingly to accommodate the smaller transistors. Graph 102 represents the similar correlation in low power designs.

Figure 2:
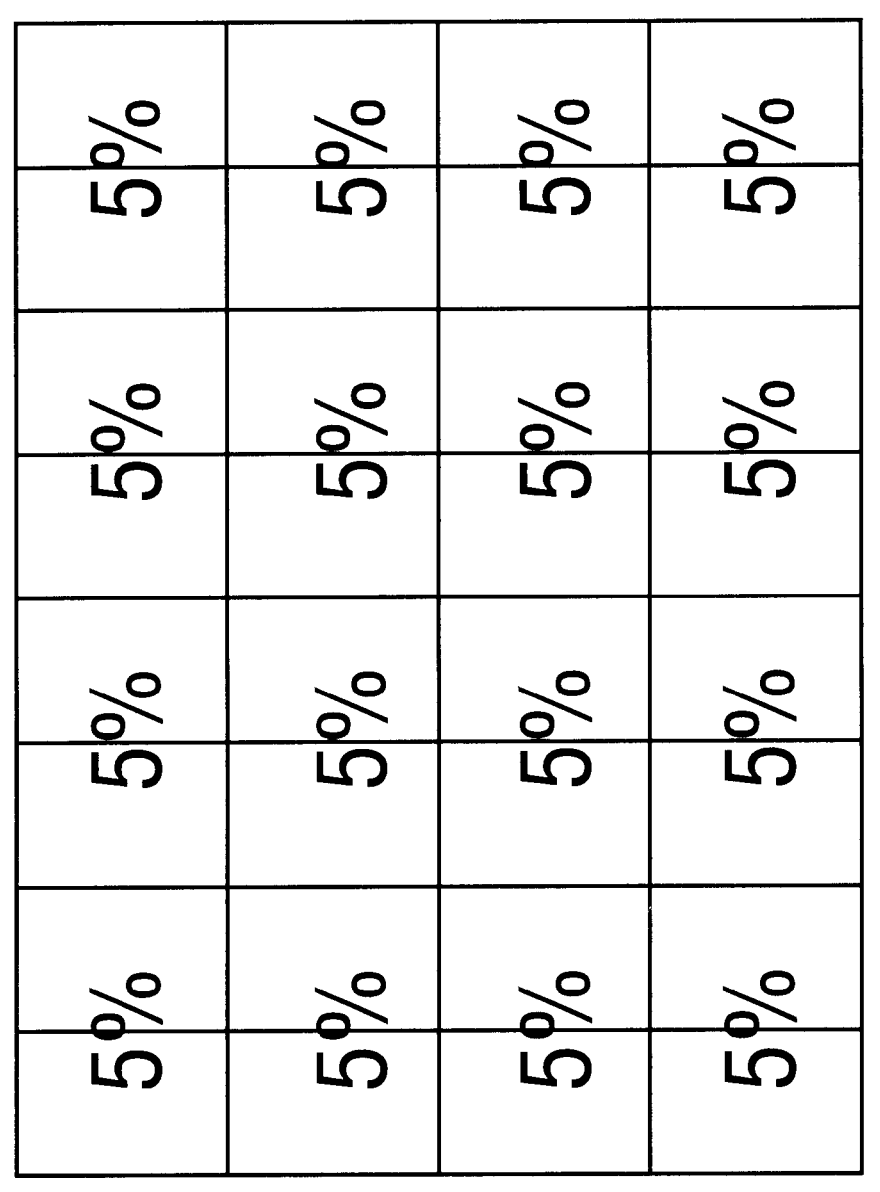

FIG. 2 illustrates a power grid using the prior art method of pre-allocating decoupling capacitance. The decoupling capacitors are evenly distributed in the power grid. In this example, five percent (5%) of the layout area is reserved for the decoupling capacitance in each layout window. This technique of setting a pre-allocated percentage is inefficient as it assumes the power noise is roughly the same at all nodes in the power grids. Therefore, using this technique will typically result in some over estimation of the power noise, and as a result may result in over-estimation of decoupling capacitance and sacrifice of layout density.

Generally, the determination of the number of decoupling capacitors and the size of the decoupling capacitors is based upon the maximum switching rate of the transistors and the power supply noise that the internal logic can tolerate. Although there may be multiple noisy power nodes having the power drop ΔV that goes beyond a voltage threshold, for example, a minimum voltage threshold, not all of these noisy power nodes have the same peak level voltages. Furthermore, there may be noisy power nodes that are within the maximum voltage threshold and the minimum voltage threshold. Therefore, it may be that not every power node needs to have a similarly sized decoupling capacitors, if at all, as is currently done in the prior art shown in FIG. 2.

In one embodiment of the present invention, the power grid is examined to identify those power nodes that violate the thresholds. Depending on the application, the thresholds may be set such that the power supply noise at a power node can fluctuate within a certain range and still be considered to be tolerable. For example, in one embodiment, the voltage drop ΔV may be considered acceptable if it is between 3 to 10 percent of the power supply voltage. After the violating power nodes are identified, decoupling capacitors are placed at the violating power nodes and a process of sizing the decoupling capacitors is performed until the voltage drop at the violating nodes are within the thresholds.

Figure 3:
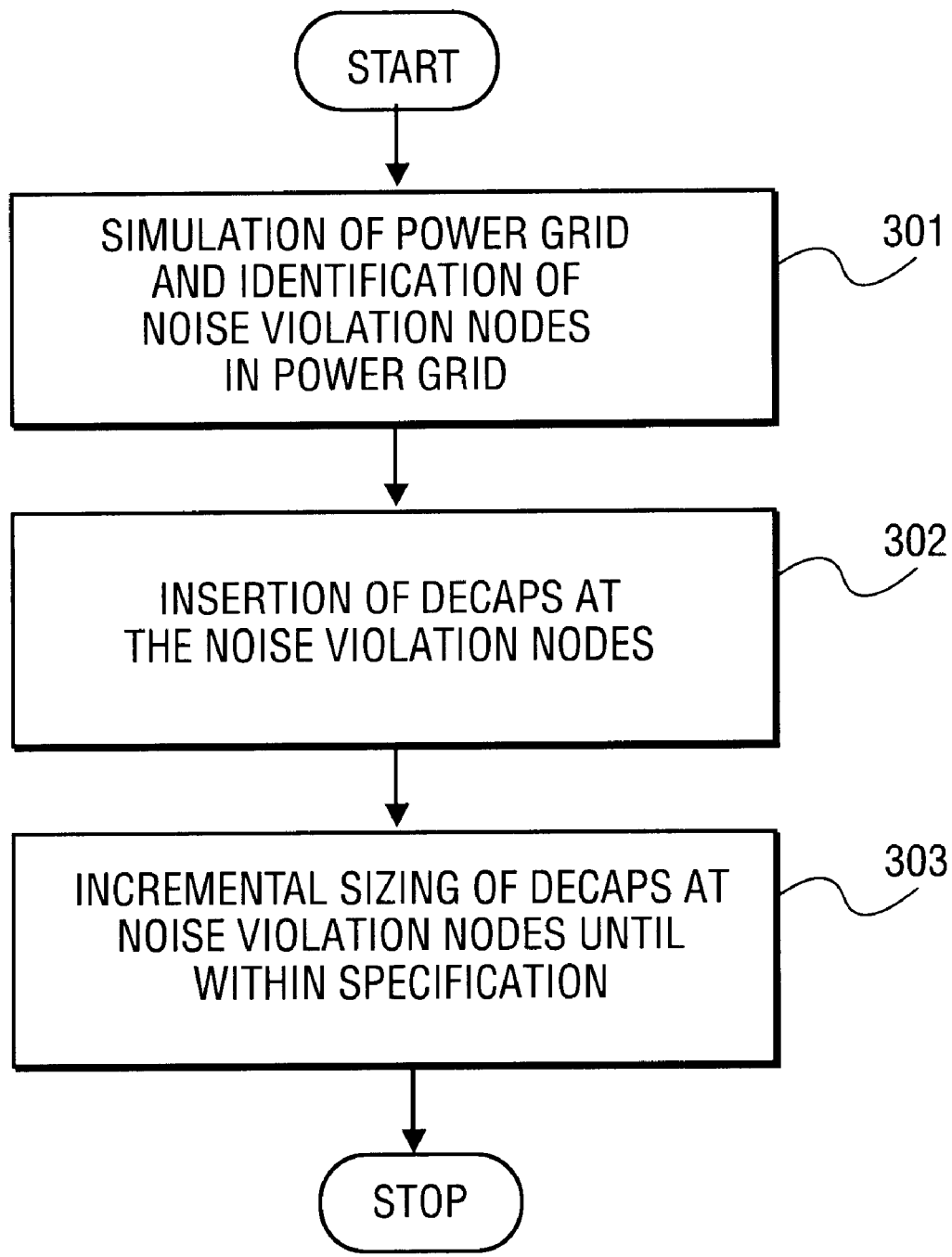
FIG. 3 illustrates an exemplary flow diagram of a process to identify noisy nodes and to size decoupling capacitance to be inserted at the noisy nodes in accordance with one embodiment of the present invention.

FIG. 3 is an exemplary flow diagram showing a method of one embodiment. At block 301, a power grid RLC model is evaluated to identify the power nodes that violate the voltage thresholds or noise margin. In general, peak voltages in a power node are acceptable if they are within a predetermined percentage deviation of the nominal voltage level or Vdd. For example, for a nominal Vdd being 1.5V, and with a 10% deviation, the voltage peaks within a range of 1.3V to 1.8V are considered acceptable. In this example, the noise margin or voltage thresholds are from 1.3V to 1.8V. Thus any power node that has peak voltages larger than 1.8V or less than 1.3V is considered to be a noisy node. The identification of noisy nodes is performed by generating scenarios that have worst-case circuit switching.

After the violating power nodes are identified, decoupling capacitor is added to each of the violating power nodes. At block 302, the decoupling capacitors are inserted into the noisy nodes of the power grid. In one embodiment, a predetermined decoupling capacitor of a certain size is used. No decoupling capacitor is necessary in the other power nodes that do not violate the noise margin. Since each power node may have different voltage peaks, the decoupling capacitors are sized accordingly to bring the violating power nodes or noisy nodes to within the required noise margin, as shown in block 303. By incrementally adding the decoupling capacitors to the noisy nodes, eventually the peak voltages of these noisy nodes will be brought to within the noise margin. As a result, the power grid will have a smaller amount of required decoupling capacitance, reducing over estimation of decoupling capacitance while keeping the number of noisy nodes low. That is, all the nodes in the power grid have the peak voltages within the noise margin.

Figure 4:
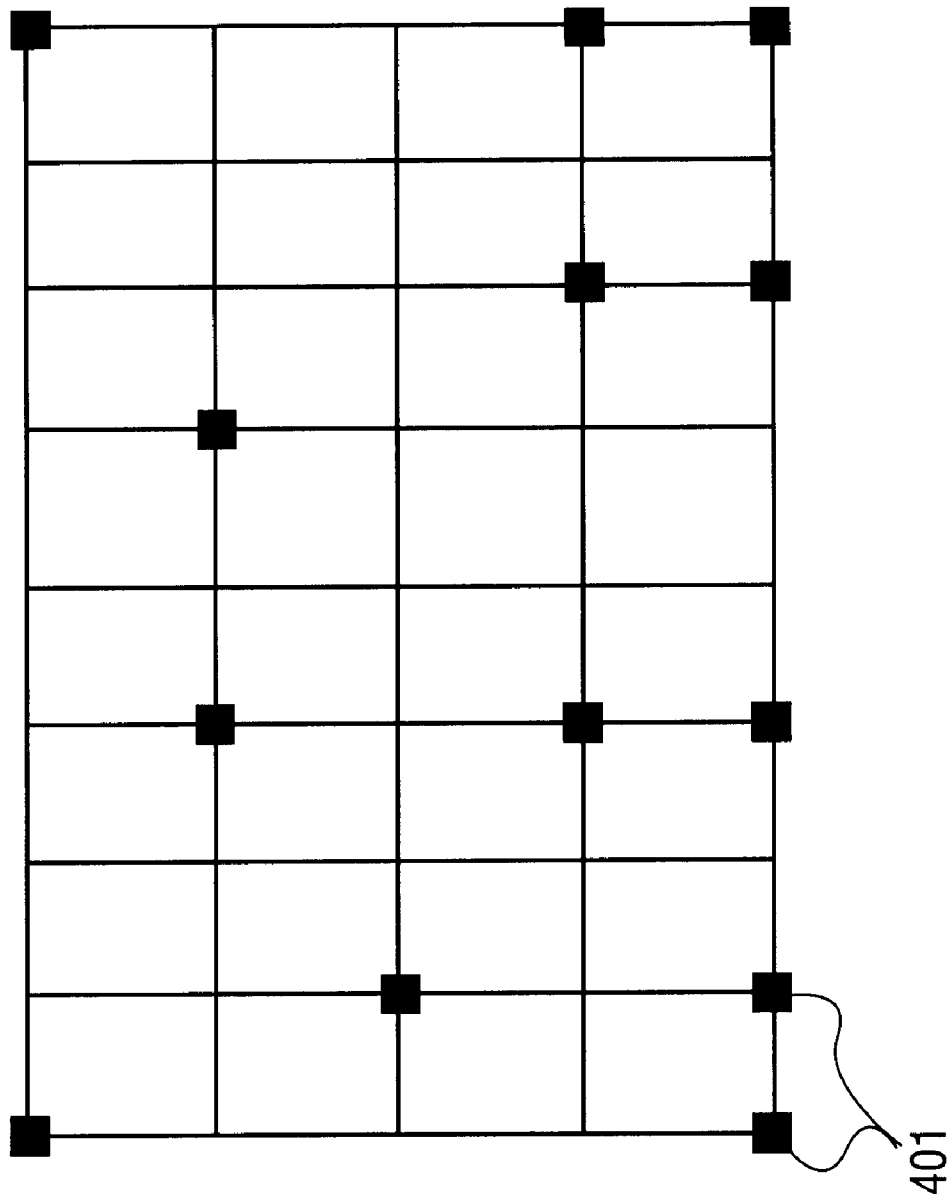
FIG. 4 illustrates an exemplary diagram of an embodiment where the decoupling capacitance is added only for noise violation nodes.

FIG. 4 illustrates an exemplary power grid having decoupling capacitors 401 inserted using the technique according to one embodiment. The decoupling capacitors 401 are added only for noisy nodes or violating nodes, and are not distributed evenly as in the prior art. The placement of the decoupling capacitors 401 in the current invention increases the device area while maintaining power noise budget. As illustrated in FIG. 4, there is not a decoupling capacitor 401 at every power node. Only the nodes highlighted are considered noisy nodes and need to have decoupling capacitors 401 inserted.

In the present embodiment, a power grid model is a RLC network. The RLC network is defined by a layout extraction tool or by power grid designers. If the RLC network is too big, each power line can be modeled as a series of RLC elements. These RLC elements can then be linked with one another based on the connections of the power grid. A transistor circuit model is used with the power grid RLC model. Each transistor connected to the power grid can be modeled as a current source. Current simulation is done for the transistor circuit to get the current source model. In one embodiment, a linearized ramped current source model is used for each transistor. Other current source models may be used without departing from the scope of the current invention.

In one embodiment, using the power grid RLC model, the transistor circuit model, and the current source model as input, a Power Noise Verifier (PNV) tool is used to analyze the power grid in functional blocks or units. Alternatively, other tools designed to provide the same functionality as the PNV tool may also be used. The PNV tool detects those nodes in the power grids that violate the power noise margin. In one embodiment, an input configuration file is used to provide the tolerable noise margin, including a maximum voltage threshold and a minimum voltage threshold. For example, the tolerable voltage level for each power node is between 1.15V and 1.5V. Therefore, a power node having voltage peaks larger than 1.5V or lower than 1.15V is considered a violating node. The PNV tool gets the specified voltage thresholds from the configuration file and tests each power node against the threshold voltages to identify the violating nodes in power grids.

Figure 5:
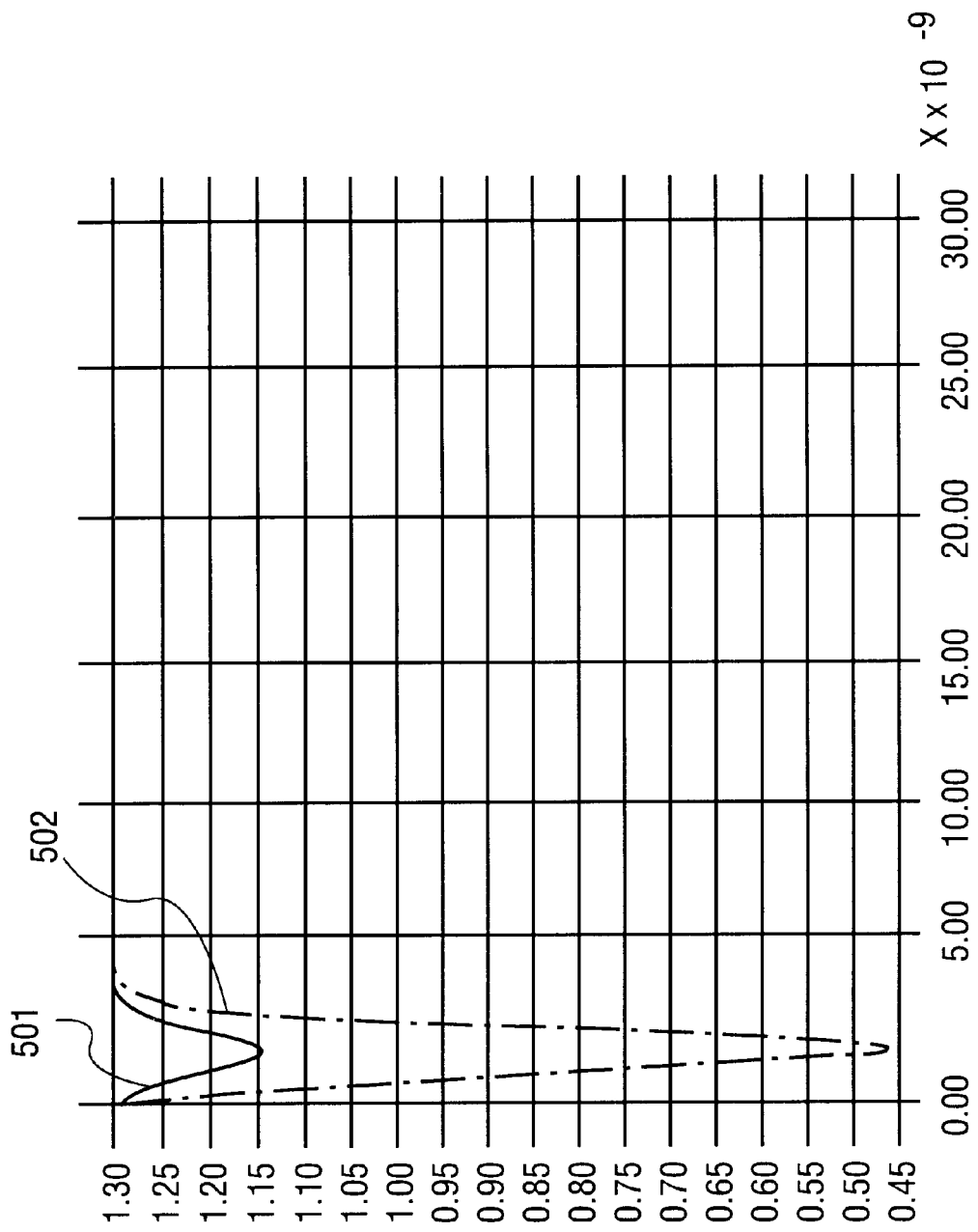
FIG. 5 illustrates exemplary waveforms of power nodes that violate noise margin.

An example of the violating power nodes identified by the PNV tool is shown in voltage waveforms in FIG. 5. In this example, the minimum voltage threshold is set at 1.15V. The first violating node corresponds to waveform 501 and is found to have a minimum peak voltage level at approximately 1.14V. The second violating node corresponds to waveform 502 and is found to have a minimum peak voltage level at approximately 0.47V.

In one embodiment, a Decap Sizing Analyzer (DSA) tool inserts and calculates the sizes of the decoupling capacitors at the noisy nodes. Alternatively, other tools providing the same functionality may also be used. The DSA gets the voltage simulation results for the nodes of the power grids from the PNV tool outputs. The DSA reads the configuration file to retrieve the allowable voltage thresholds and the decoupling capacitor increment size. Based on the identification of violating nodes from the PNV tool, the DSA uses the decoupling capacitor increment information from the configuration file and increments the size of the decoupling capacitor at each violating node in the power grid. The PNV tool is then applied to the power grid to identify power nodes that still violate the specified thresholds. The size of the decoupling capacitor for each violating node is incremented until the peak voltages at the power nodes are within the specified thresholds. The threshold information is specified in the configuration file.

Figure 6:
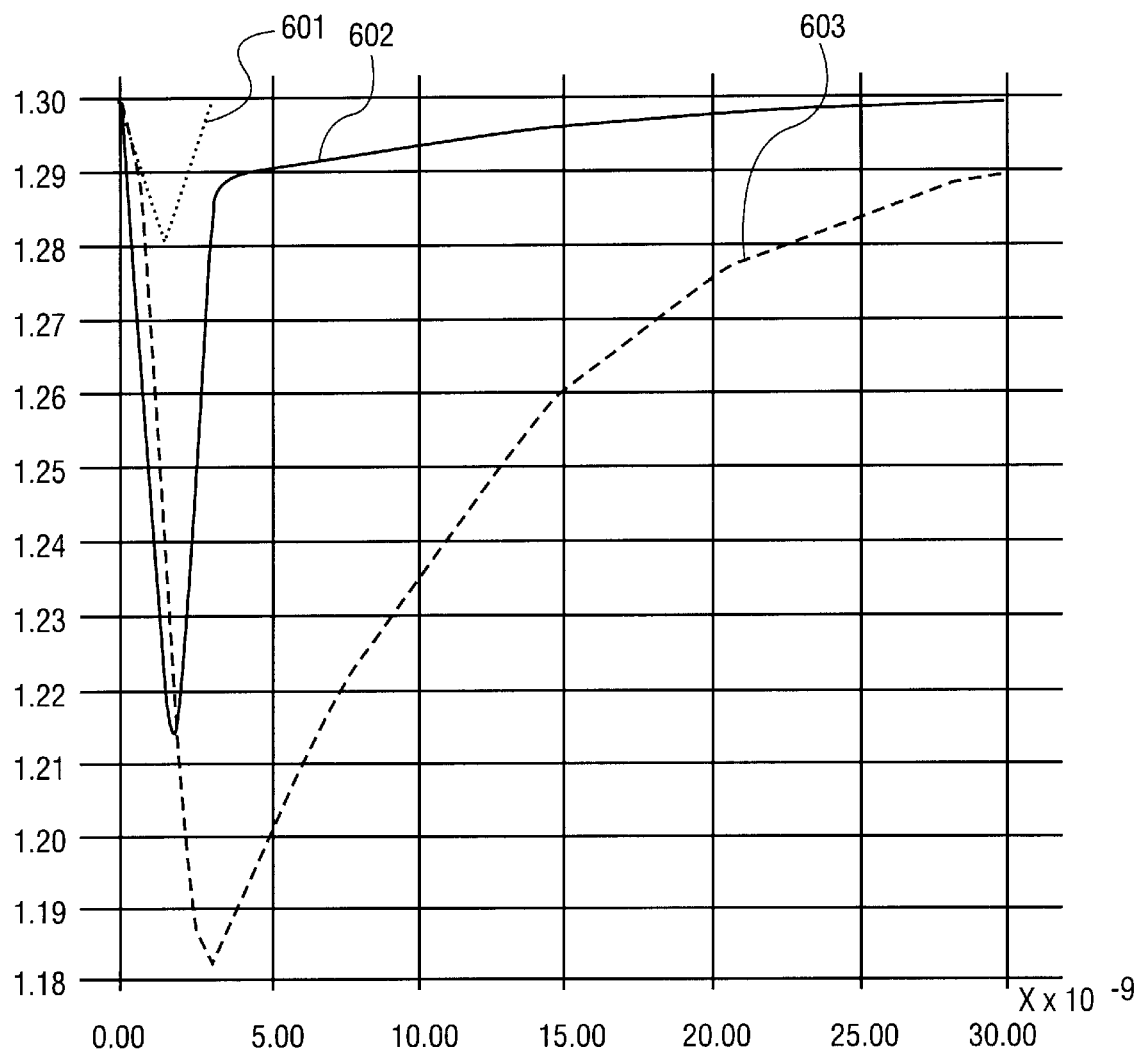
FIG. 6 illustrates exemplary waveforms of power nodes after insertion of decoupling capacitance with all nodes having no violation of noise specification.

This process of applying the PNV tool and the DSA tool iterates until there are no violating nodes in the power grid or until all the power nodes are within the voltage thresholds. The size of the decoupling capacitor for each violating node and the location of the violating nodes are reported in an output file. FIG. 6 illustrates exemplary voltage waveforms for three power nodes after applying the method of one embodiment of the present invention. Waveform 601 has a minimum peak voltage at approximately 1.28V. Waveform 602 has a minimum peak voltage at approximately 1.21V. Waveform 603 has a minimum peak voltage at approximately 1.18V. The power nodes represented by the waveforms 602 and 603 are the same power nodes represented by waveforms 501 and 502 in FIG. 5. By applying the DSA tool, the necessary decoupling capacitor is added to each node and sized to bring the minimum peak voltages to within the specified minimum threshold voltage of 1.15V. In this example, the power node represented by waveform 603 has the lowest peak voltage at approximately 1.18V.

Figure 7:
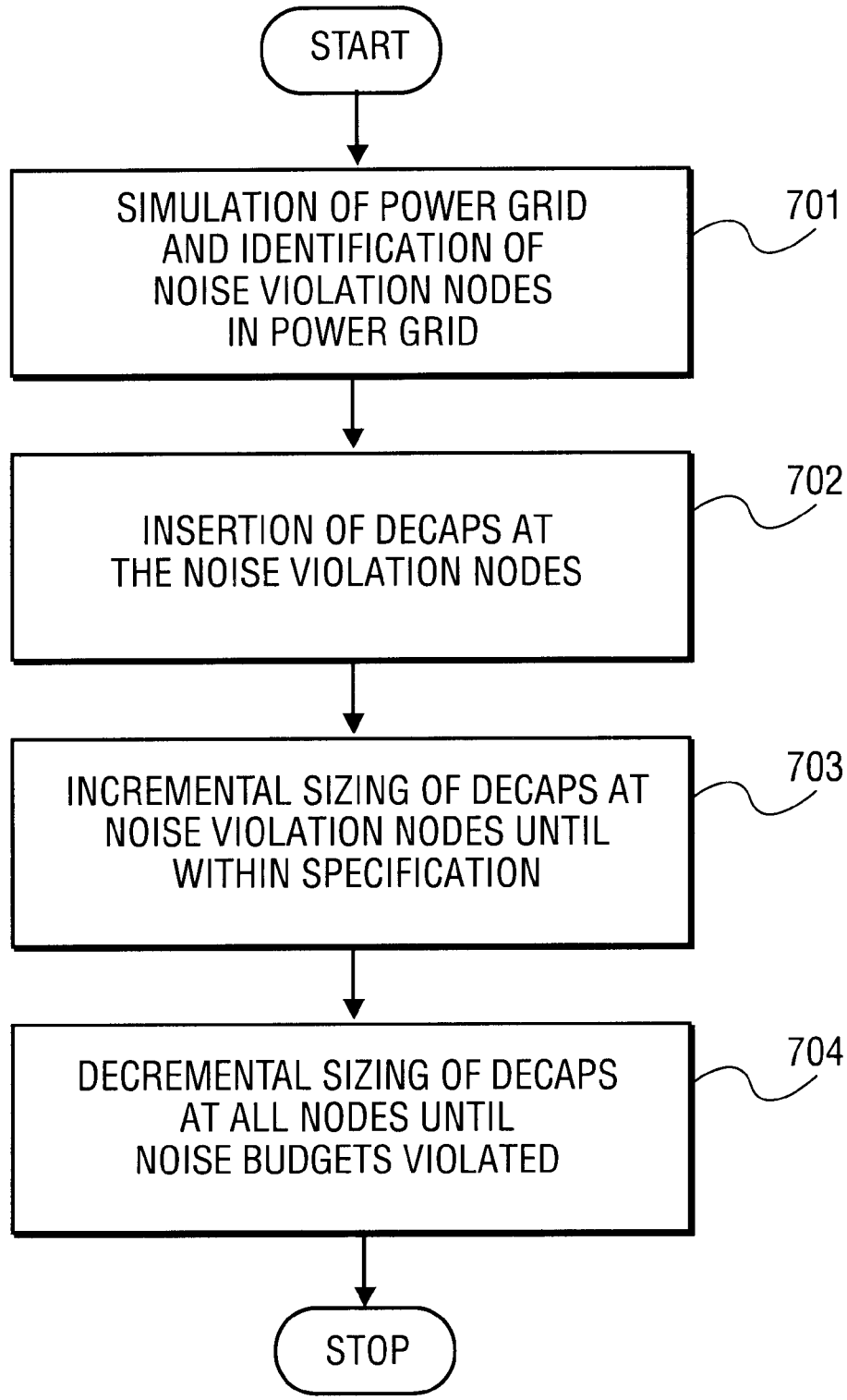
FIG. 7 illustrates an exemplary flow diagram of another embodiment of a method to insert and to size decoupling capacitance where the decoupling capacitance can be reduced at the last stage.

FIG. 7 illustrates, in another embodiment, an exemplary flow diagram showing how the technique of one embodiment is used to improve the insertion and sizing of decoupling capacitance in the power grid. In this embodiment, the insertion and sizing of the decoupling capacitor is improved by first incrementing the size of the decoupling capacitors and then decrementing the size of the decoupling capacitors to prevent any over allocation. In block 701, the PNV tool is used to identify violating nodes in the power grid. Initially, the decoupling capacitor is inserted at each violating node, as shown in block 702. After this initial insertion, some of the violating power nodes may now be within the voltage thresholds while some remains to be violating power nodes.

In a first pass, at block 703, the DSA tool is applied to increment the size of the decoupling capacitors for the power nodes that are not within the voltage thresholds. This is repeated until the peak voltage levels at these power nodes are within the voltage thresholds. Therefore, after the first pass, there are no noisy nodes in the power grid since the all the nodes are already within the noise margin or voltage thresholds. However, there may be some over-allocation of decoupling capacitance since not all of the violating power nodes have the same peak level voltages. This includes the violating power nodes that were brought to within the noise margin after the initial insertion of the decoupling capacitance.

In a second pass, at block 704, the DSA tool is applied to decrement the size of the decoupling capacitor of each power node while the power nodes are within the voltage thresholds. In this embodiment, since the noise margin has been satisfied in the first pass of the optimization process, the noise margin will remain satisfied in the second pass. Therefore, the noise margin of the power grid is satisfied with the optimized number of decoupling capacitors.

In one embodiment, a computer-readable medium containing various sets of instructions, code sequences, configuration information, and other data used by a computer or other processing device to carry out the functions described in the present invention. The embodiment is suitable for use with the functions of identifying the violating power nodes, the insertion of decoupling capacitance in the violating power nodes, and the sizing of the decoupling capacitance until all the power nodes are within noise budgets or voltage thresholds. The various information stored on the computer-readable medium is used to perform various data processing operations. The computer-readable medium is also referred to as a processor-readable medium. The computer-readable medium can be any type of magnetic, optical, or electrical storage medium including a diskette, magnetic tape, CD-ROM, memory device, or other storage medium. The computer-readable medium may include interface code that controls the flow of information between various devices or components in the computer system. The interface code may control the transfer of information within a device (e.g., between the processor and a memory device), or between an input/output port and a storage device. Additionally, the interface code may control the transfer of information from one device to another.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method, comprising:

evaluating a power grid at a first time to identify a first set of noisy nodes;

inserting a decoupling capacitor of a predetermined size at each of the noisy nodes in the first set of noisy nodes;

evaluating the power grid at a second time to identify a second set of noisy nodes;

incrementing the size of the decoupling capacitor at each noisy node in the second set of noisy nodes; and after incrementing the size of the decoupling capacitors and there are no more noisy nodes, decrementing the size of the decoupling capacitor at each previously identified noisy node by a predetermined capacitor decrement while maintaining noise level at each previously identified noisy node within corresponding predetermined maximum voltage threshold and predetermined minimum voltage threshold.

2. The method of claim 1 wherein evaluating the power grid at a first time to identify a first set of noisy nodes comprises:

measuring a maximum peak voltage level and a minimum peak voltage level at each of a plurality of power nodes in the power grid; and for each power node, comparing the maximum peak voltage level with a corresponding predetermined maximum voltage threshold and comparing the minimum peak voltage level with a corresponding predetermined minimum voltage threshold.

3. The method of claim 2 wherein incrementing the size of the decoupling capacitor at each noisy node in the second set comprises adding a predetermined capacitor increment to the decoupling capacitor at each noisy node in the second set until each of the noisy nodes in the second set is within its corresponding predetermined minimum voltage threshold and predetermined maximum voltage threshold.

4. A method, comprising:

identifying a plurality of noisy nodes from a plurality of power nodes in a power grid;

placing a decoupling capacitor of a predetermined size at each of the plurality of noisy nodes;

increasing the size of the decoupling capacitor at each of the noisy nodes to bring the noisy node to within its corresponding voltage thresholds; and optimizing the size of the decoupling capacitor at each of the noise nodes by decrementing the size of the decoupling capacitor at each of the noisy nodes by a predetermined capacitance decrement until just before the noisy node violates its corresponding voltage thresholds.

5. The method of claim 4, wherein a noisy node is identified by comparing a minimum peak voltage level and a maximum peak voltage level of a power node with the voltage thresholds of that power node.

6. The method of claim 4 wherein each decoupling capacitor is increased by a predetermined incremental size.

7. The method of claim 4 wherein increasing the size of the decoupling capacitor comprises:

evaluating the noisy nodes against the corresponding voltage thresholds after increasing the size of the decoupling capacitors.

8. A computer readable medium containing instructions which, when executed in a processing system, causes the processing system to perform a method for inserting decoupling capacitance, comprising:

identifying one or more noisy nodes from a plurality of power nodes in a power grid;

placing a decoupling capacitor of a predetermined size at each of the noisy nodes;

increasing the size of the decoupling capacitor at each noisy node to bring the noisy node to within its corresponding voltage thresholds; and decreasing the size of the decoupling capacitor at each noisy node to remove any excess decoupling capacitance, wherein the size of the decoupling capacitor at each noisy node is decreased by a predetermined decrement size until just before the noisy node violates its corresponding voltage thresholds.

9. The computer readable medium of claim 8, wherein the noisy nodes are identified by comparing minimum peak voltage level and maximum peak voltage level of each of the power nodes with the corresponding voltage thresholds.

10. The computer readable medium of claim 8, wherein each decoupling capacitor is increased by a predetermined increment size.

11. The computer readable medium of claim 10, wherein increasing the size of the decoupling capacitor at each noisy node comprises adding the predetermined increment size to the decoupling capacitor, determining if the noisy node is within the corresponding voltage thresholds, and repeating said adding and determining when the noisy node is not within the corresponding voltage thresholds.

12. An apparatus comprising means for evaluating a plurality of power nodes in a power grid to identify a plurality of noisy nodes;

means for inserting a decoupling capacitor of a predetermined size at each of the noisy nodes;

means for reducing noise at each of the noisy nodes to a corresponding tolerable range; and means for optimizing size of the decoupling capacitor at each of the noisy nodes to remove excess decoupling capacitance while keeping the noisy node within the corresponding tolerable range, comprising:

means for decrementally decreasing the size of the decoupling capacitor at the noisy node using a predetermined decrement size, and means for re-evaluating the noisy node after each decrement.

13. The apparatus of claim 12 wherein the tolerable range is from a minimum voltage threshold to a maximum voltage threshold.

14. The apparatus of claim 12 wherein the means for reducing noise at each noisy node to the corresponding tolerable range comprises:

means for incrementally increasing the size of the decoupling capacitor at the noisy node, and means for re-evaluating the noise at the noisy node after each increment to determine if the noisy node is within its corresponding tolerable range.

15. An apparatus, comprising:

a memory device to store configuration information;

an input device coupled to the memory device, the input device to receive a power grid model comprising of a plurality of power nodes; and a processor coupled to the memory device and to the in put device, the processor to:

evaluate the plurality of power nodes to identify a plurality of noisy nodes using the configuration information;

insert a decoupling capacitor of predetermined size at each of the noisy nodes;

reduce noise at each noisy node to a corresponding tolerable range as specified in the configuration information; and optimize the size of the decoupling capacitor at each noisy node by decrementally decreasing the size of the decoupling capacitor at each noisy node, and re-evaluating each noisy node after each decrement to keep the noisy nodes within the corresponding tolerable range.

16. The apparatus of claim 15 wherein the tolerable range is from a minimum voltage threshold to a maximum voltage threshold.

17. The apparatus of claim 15 wherein the noise at each noisy node is reduced to the tolerable range by:

incrementally increasing the size of the decoupling capacitor at each noisy node using a predetermined increment size, and re-evaluating the noise at the noisy nodes after each increment.

18. An apparatus comprising a memory;

a processor coupled to the memory, the processor executing a set of instructions to:

evaluate a plurality of power nodes in a power grid to identify a plurality of noisy nodes;

insert a decoupling capacitor of a predetermined size at each of the noisy nodes;

reduce noise at each noisy node to a tolerable range; and optimize the size of the decoupling capacitor at each noisy node by repeatedly decreasing the size of the decoupling capacitor by a predetermined decrement while keeping the noisy node within the tolerable range.

19. The apparatus of claim 18, wherein the tolerable range is from a minimum voltage threshold to a maximum voltage threshold.

20. The apparatus of claim 18, wherein the noise at each noisy node is reduced to the tolerable range by:

incrementally increasing the size of the decoupling capacitor at each noisy node using a predetermined increment, and re-evaluating the noise at the noisy node after each increment.

* * * * *